Figure 1:
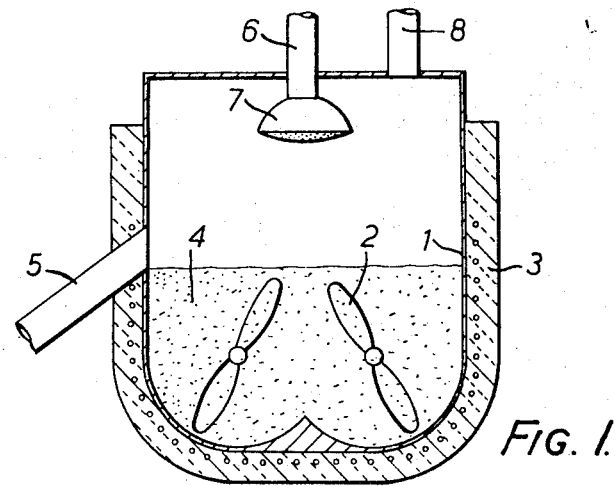

United States Patent

[11] 3,632,974

| [72] | Inventors | Frederick Claud Cowlard;<br>George Ord, both of Ilford, England |
|---|---|---|
| [21] | Appl. No. | 746,395 |
| [22] | Filed | July 22, 1968 |
| [45] | Patented | Jan. 4, 1972 |
| [73] | Assignee | The Plessey Company Limited<br>Ilford, England |
| [32] | Priority | July 27, 1967 |
| [33] | | Great Britain |
| [31] | | 34,567/67 |

[54] HEAT TRANSFER APPARATUS
3 Claims, 3 Drawing Figs.

[52] U.S. Cl. .................................................. 219/271,
23/1 F, 23/288 J, 34/166, 159/48 R, 165/109,
219/388, 263/21
[51] Int. Cl. ......................................................... H05b 3/00,
B01j 2/10
[50] Field of Search........................................... 219/365,
378, 385, 387, 388, 390, 271–275; 263/21, 25, 26;
34/166, 173, 178, 10, 57; 165/109; 23/277, 288.3,
1 F, 200, 288 S, 288 H, 288 J; 266/20; 159/48 R,
DIG. 3

[56] References Cited
UNITED STATES PATENTS

| 2,416,615 | 2/1947 | Datin............................ | 159/DIG. 3 |
| 2,600,253 | 6/1952 | Lutz............................. | 159/DIG. 3 |
| 2,856,273 | 10/1958 | Beber et al..................... | 23/1 F |
| 3,202,731 | 8/1965 | Grevenstuk et al............ | 159/DIG. 3 |
| 3,376,124 | 4/1968 | Hollingsworth............... | 159/DIG. 3 |
| 1,447,013 | 2/1923 | De Graaf....................... | 165/109 X |
| 1,478,347 | 12/1923 | Mitchell......................... | 263/25 |
| 1,942,382 | 1/1934 | Britton........................... | 219/385 X |
| 3,159,703 | 12/1964 | Wolcott.......................... | 263/25 X |
| 3,236,509 | 2/1966 | Blair............................... | 263/26 X |
| 3,307,840 | 3/1967 | Conroy........................... | 263/21 |
| 3,378,246 | 4/1968 | Leding........................... | 263/26 |

FOREIGN PATENTS

| 735,552 | 5/1966 | Canada......................... | 159/48 R |
| 498,198 | 10/1919 | France.......................... | 219/385 |

Primary Examiner—A. Bartis
Attorney—Scrivener, Parker, Scrivener and Clarke

ABSTRACT: A reaction vessel for making granular ferrite material from a stoichiometrically mixed solution of nitrates of the metals present in the ferrite molecular comprises a heatable container having overflow means for maintaining a bed of granular material in the container at a predetermined level, a mixing conveyor for the granular material which is wholly submerged in the granular material below this level, and a spray-feed device for distributing the mixed solution in droplet form over the surface of the bed of granular material.

PATENTED JAN 4 1972  3,632,974

HEAT TRANSFER APPARATUS

This invention relates to apparatus for the heat treatment of liquid and has for an object to provide an improved apparatus for making granular material containing a plurality of components in uniform mixture by a process including the evaporation of a mixed solution of a plurality of salts. Another object is to provide an improved apparatus for making granular ferrite material by a process including the evaporation of a stoichiometrically mixed solution of the nitrates of the metals present in a ferrite molecule. A still further object is to provide an improved apparatus for the direct conversion of a mixed solution into granular material by distributing the solution in droplet form over the surface of a heated bed of such granular material which is kept in mixing motion while maintaining the conditions so that each droplet becomes evaporated and, particularly in the case of a ferrite process, decomposed, before any component having a relatively high decomposition temperature can become separated from components having a lower decomposition temperature, and without minimizing the risk of attachment of any of the resulting solid material to any part of the apparatus. With these and other objects in view the invention, broadly speaking comprises a container for a granular medium, means for maintaining a medium in the container at a predetermined level and at an elevated temperature and means for circulating the medium in the container such that the medium may be kept in a state of agitation, the container including an inlet means above the level defined by the surface of the granular medium for admitting material for being heated in the apparatus. The circulating means may preferably remain substantially wholly below the surface of the medium during operation of the apparatus. The inlet means are arranged to distribute the material for heating over the effective surface of the granular medium. The distributing means may comprise a spray head.

The apparatus may include an outlet port positioned substantially above the surface of the granular medium. Conveniently the outlet port may comprise an overflow pipe positioned at a desired level of the granular medium so that a rise in the level of the medium will cause a gravitational flow of the medium down the outlet pipe.

The granular medium may comprise ceramic pellets, steel balls or other suitable particulate solids.

The reaction vessel may use as the granular medium one or more of the reactants or end products of the reaction which it is required to carry out. If the required reaction for example is between liquids which will produce a solid end product, it may be convenient to feed the liquids on to the surface of the granular medium, and for this granular medium itself to be the required solid product of the reaction. As the amount of solid end product of the reaction increases in volume within the vessel, the level of the granular medium will rise and the end product will flow out of the vessel down the outlet port so that the level of medium within the vessel is maintained substantially constant. If desired the granular substance may be removed from the vessel by alternative means such as use of a screw conveyor.

The reaction vessel may also include a port for permitting gaseous reaction products to escape from the vessel.

Figure 2:
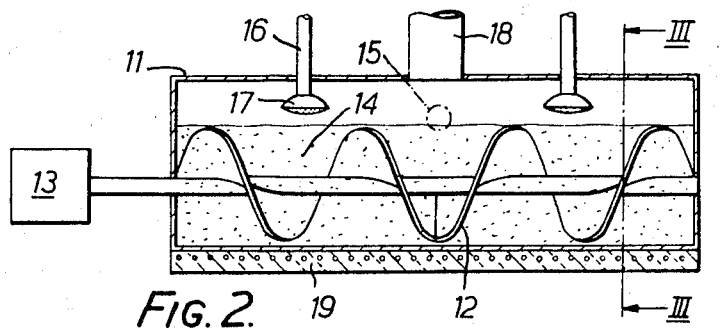
Figure 3:
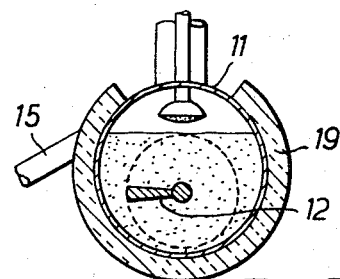

By way of example an embodiment of the invention will be further described with reference to the accompanying drawings in which FIG. 1 shows a cross-sectional view through heat transfer apparatus according to the invention, FIG. 2 is a part cross-sectional view through a different form of heat transfer apparatus, and FIG. 3 is a cross section along the line III—III on FIG. 2.

The heat transfer apparatus shown in FIG. 1 comprised a container 1 having in its lower region two paddles 2 so that this portion of the vessel will be somewhat similar in construction to that of one form of mixer for powders. The paddles 2 were connected through gearing with a suitable motor so that they could be rotated whilst the reaction vessel was in operation. On an outside surface of the container 1 an electric heating jacket 3 was fixed. A lower part of the container was filled with a granular solid 4 which acted on a heat transfer medium. The depth of the granular solid 4 was such that it just about covered the tips of the paddles 2 when they rotated during operation of the apparatus. The container included an outlet pipe 5 positioned in a wall of the container such that any increase in the volume of the granular solid 4 would cause the excess to flow under gravity out of the overflow pipe. An upper part of the container 1 included an inlet pipe 6 terminating in a spray nozzle 7. A vent port 8 in the container wall allowed gaseous reaction products to pass out of the container.

This example of heat transfer apparatus according to the invention was designed as a reaction vessel to carry out a process for making ferrites in which stoichiometric a mixture of aqueous solutions of the nitrates of the required metallic ions are dropped or sprayed on to a hot surface in such manner that any accumulation of liquid is avoided. In the present apparatus therefore the aqueous solution of the nitrates were fed into the reaction vessel through the inlet pipe 6 and spray nozzle 7. A spray of the nitrate solution was thus directed on to the surface of the granular solid 4 whilst the surface of the solid was maintained at a temperature of about 250° C. The surface was also agitated by movements of the paddles 2 during operation of the reaction vessel. When the spray droplets of the solution came into contact with the heated granular surface, the solvent was volatilized and the resulting deposited nitrates were decomposed to oxides. In this particular example the granular solid 4 used in the apparatus was formed of grains of the ferrite that it was required to make.

The spray droplets reaching the agitated surface of ferrite granules were thus converted to oxide and this became rapidly mixed with the ferrite particles during the agitation of the surface and the bulk of the ferrite by the paddles 2. As the quantity of ferrite and oxide in the container 1 increased during operation of the apparatus, excess ferrite and oxide escaped down the outlet pipe 5 so that the level of granular solid 4 in the container remained substantially constant. The granular material escaping from the outlet pipe 5 was then calcined while being subjected to agitation to obtain spinel crystal ferrite. The gaseous decomposition products of the nitrates left the container 1 through the vent port 8 and were fed to suitable plant for recovery of the nitrogen.

Use of the apparatus of the invention in this ferrite process for the drying and decomposition of the nitrates was found to be effective and the apparatus was able to be worked in a continuous process without any evidence of caking or clogging even on a prolonged run. The solid material emerging from the outlet pipe 5 appeared to be remarkably constant in particle size and was found to be particularly suitable for calcining to form a spinel-structure ferrite.

A different form of heat transfer apparatus according to the invention is depicted in FIGS. 2 and 3 of the drawings. In this embodiment, the container 11 is a cylinder positioned with its axis horizontal. A screw agitator blade 12 has an axis of rotation parallel to the axis of the cylindrical container, and the agitator blade 12 may be caused to rotate by means of a motor 13.

The screw agitator blade 12 is made in two parts corresponding to left-hand and right-hand screw threads so that a granular solid 14 constituting a heat transfer medium will tend to be moved from the ends of the cylinder to the middle when the motor 13 is running.

In the middle of the length of the cylinder an outlet pipe 15 was located. Midway between this pipe and the ends of the cylinder were inlet pipes 16 terminating in spray nozzles 17. A port 18 allowed the escape of gaseous reaction products from the cylinder.

An electric heating jacket 19 was wrapped round an outside wall of the cylinder. This position of the heating jacket combined with the choice of a cylindrical shape for the container was found to give more effective transfer of heat than in the embodiment illustrated in FIG. 1. The better heating enables a greater throughput of material to be treated by the apparatus in a given time.

The apparatus in operation caused the granular solid 14 to be moved continuously from the ends of the container towards the center, and this feature enabled liquid to be sprayed in at two places on to the agitated surface of the solid. The spraying points were midway between the ends of the container and its center and in these regions the movement of the granular solid was at a maximum.

As with the apparatus depicted in FIG. 1, solid material accumulating within the container was allowed to escape by a gravitational flow down the outlet pipe 15. In this region of the container there was a minimum movement of the granular solid 14 by the agitator blade 12—this feature was found to be advantageous in reducing the quantity of solid 'fines' that were entrained in the gaseous effluent passing out of the container up the port 18.

When the apparatus of FIGS. 2 and 3 was used for the manufacture of a ferrite by the process already described, the different location of the spray nozzles 17 was also found to promote more complete denitration of the solid reaction product before leaving the reactor. The efficiency of this apparatus was thus enhanced as compared with that of FIG. 1.

The foregoing description of an embodiment of the invention has been given by way of example only, and a number of modifications may be made without departing from the scope of the invention. For instance although the heat transfer apparatus has been described in the first example as a reaction vessel for the manufacture of ferrite, it is clear that it can be used for other heat transfer and reacting operations.

What we claim is:

1. In apparatus for making granular material containing a plurality of components in uniform mixture by a process including the evaporation of a mixed solution of a plurality of salts, the combination comprising a substantially closed container having a lower portion for the accommodation of a bed of granular material and an upper portion, means for heating said lower portion, overflow means allowing, when the granular material in the container reaches a predetermined level, any excess of granular material to leave the container, said container including a top wall portion spaced from such bed, mechanical mixing means moving through the granular material of such bed for producing mixing movement of said bed of granular material without a substantial increase in the volume of the bed over its settled volume, feed means for introducing such mixed solution into said container, and a vent portion of the container for the removal of vaporized material, said feed means leading into said upper portion and being so constructed and arranged as to distribute such solution in droplet form over the surface of said bed of granular material when the bed is being agitated by said mechanical mixing means without a substantial increase in its volume over its settled volume.

2. Apparatus as claimed in claim 1, wherein the mechanical mixing means is a worm-type agitator wholly submerged below the surface of such bed of granular material.

3. In apparatus for making granular ferrite material by a process including the evaporation and decomposition of a stoichiometrically mixed solution of the nitrates of the metals present in the ferrite molecules, the combination comprising a substantially closed container having a lower portion for the accommodation of a bed of granular ferrite material and an upper portion, means for heating said lower portion to maintain said bed at a temperature above 200° C, overflow means allowing, when the granular ferrite material in the container reaches a predetermined level, any excess of granular ferrite material to leave the container, said container including a top wall portion spaced from such bed, mechanical mixing means moving through the granular material of said bed for producing mixing movement of said bed of granular ferrite material without a substantial increase in the volume of the bed over its settled volume, said mixing means being so arranged in said container as to be wholly immersed in such bed of granular material, feed means for introducing such stoichiometrically mixed solution into said container, and a vent port in the upper portion of the container for the removal of vaporized material, said feed means leading into said upper portion and being so constructed and arranged as to distributed such solution in droplet form over the surface of said bed of granular ferrite material when the bed is being agitated by said mechanical mixing means without a substantial increase in its volume over its settled volume.

* * * * *